United States Patent [19]

Salinger

[11] 4,082,301

[45] Apr. 4, 1978

[54] MOUNTING GROMMET FOR AN ELECTRIC HEATING ELEMENT USED IN APPLIANCES AND THE LIKE

[75] Inventor: Fred G. Salinger, Baltimore, Md.

[73] Assignee: Electro-Therm, Inc., Laurel, Md.

[21] Appl. No.: 702,815

[22] Filed: Jul. 6, 1976

Related U.S. Application Data

[62] Division of Ser. No. 530,321, Dec. 6, 1974, Pat. No. 3,997,760.

[51] Int. Cl.[2] .......... F16J 15/06

[52] U.S. Cl. .......... 277/212 F; 16/2

[58] Field of Search .......... 277/97, 212 F; 16/2; 219/336, 316, 318, 335, 523, 536; 338/317

[56] References Cited

U.S. PATENT DOCUMENTS

| | | | |
|---|---|---|---|
| 999,169 | 7/1911 | Jones | 277/212 F |
| 2,592,130 | 4/1952 | Erb et al. | 16/2 |
| 2,717,792 | 9/1955 | Pelley | 277/97 |

*Primary Examiner*—Robert I. Smith

*Attorney, Agent, or Firm*—Henry W. Collins; Paul C. Flattery; Eugene M. Cummings

[57] ABSTRACT

The embodiment of the invention disclosed herein is directed to a mounting grommet for an electrical heating element used in appliances such as dishwashers and the like. The mounting grommet is formed of a resilient body portion of a size to be forcibly urged through an aperture formed in the bulkhead of the appliance and forming a seal therewith. A neck portion is formed integral with the resilient body portion and has an axial extent substantially equal to the thickness of the bulkhead receiving the grommet. The neck portion is of a diameter substantially to fill the aperture formed in the bulkhead. A head portion is formed integral with the neck portion to overlie the aperture on the side opposite that of the resilient body portion. A passage is formed axially through the body portion, neck portion and head portion to receive the end of a heating element therethrough. A flared tubular ferrule or conical tubular ferrule is provided at the end of the body portion to receive sealing cement for permanently securing the mounting grommet to the heating element inserted therethrough.

3 Claims, 5 Drawing Figures

MOUNTING GROMMET FOR AN ELECTRIC HEATING ELEMENT USED IN APPLIANCES AND THE LIKE

This is a division of application Ser. No. 530,321, filed Dec. 6, 1974 and now U.S. Pat. No. 3,997,760.

BACKGROUND OF THE INVENTION

This invention relates generally to means for mounting a heating element to an appliance such as dishwashers and the like, and more particularly, to a new and improved mounting grommet in combination with a heating element to be inserted through a bulkhead of an appliance. The use of heating elements in appliances such as dishwashers and the like is well known in the art. In many instances the heating element in the dishwasher has a variable heat range which is selectively energized between a low heat range and a high heat range. The low heat range of the heating element is used to dry dishes in the tub of the dishwasher after the dishes have been washed and rinsed. The high heat range of the heating element is used to raise the temperature of the water within the dishwasher to a high temperature and in some instances to a sterilization temperature.

The mounting of the heating element through the bulkhead of a dishwasher must withstand high temperatures. For example, the resistance heating element for the household dishwasher may have an output of a few hundred watts more or less when in exposed air for the drying of dishes and an output of 1000 to 2000 watts more or less when submerged in water for raising the temperature of the water. When utilizing heating elements of the resistance wire type, the temperatures within the dishwasher may reach as high as 170° to 175° F. Therefore, the mounting elements used to mount the heating unit to the bulkhead of a dishwasher must be able to withstand high temperatures.

Heretofore, resistance heating elements have been provided with a threaded fitting at their terminating ends. The threaded fitting may be of brass or the like and provided with an annular head or shoulder to overlie the peripheral margin of an aperture passing through the bulkhead of the dishwasher. A gasket is then positioned between the head of the threaded fitting and the bulkhead to provide a fluid-tight seal. A locking nut is threaded to the threaded member to firmly hold the heating element in position within the dishwasher, or other similar appliance. The heating element includes terminal electrical connecting wires extending from the threaded members so that electrical power can be applied thereto. These terminal connectors are usually maintained insulated from the threaded collar by a quantity of insulating epoxy or the like, as is well known in the art. The terminal connectors are known in the art as the cold wire end of the heating unit.

When utilizing a resistance heating element with the prior art type of mounting arrangement, substantial time and cost are involved in the manufacturing process of appliances. For example, it may require one operator to insert the heating element through the bulkhead from the inside of the dishwasher and another operator to make several separate connections at the exterior of the bulkhead. Therefore, the applying of the the threaded nuts to the threaded terminal ends and electrically connecting power lines to the terminal wires of the heating element are time-consuming and costly. Furthermore, special care must be taken in properly tightening the nut to the threaded end so that a fluid-tight seal is formed at the bulkhead of the appliance.

SUMMARY OF THE INVENTION

Briefly, the mounting grommet of this invention is to be received in the bulkhead wall of an appliance requiring an electric heater. For purposes of illustration, the mounting grommet and electric heating unit are illustrated herein in conjunction with a domestic type dishwashing machine, it being understood that they may be used in other types of appliances if desired. The mounting grommet is in the form of a molded elastic part provided with an elongated bore centrally extending therethrough. The diameter of the bore, at least at one end, is slightly smaller than the outer diameter of the sheet of the heating rod to be inserted therethrough. This will provide a fluid-tight seal between the outer sheet of the heating rod and the electric material forming the mounting grommet. The mounting grommet has a body portion which is tapered in a somewhat conical fashion. A recessed groove is formed within the tapered portion of the body so that the mounting grommet can be inserted through an aperture formed in the bulkhead and locked in place by a snap-fit of the mounting grommet. A metallic insert is positioned at the end of the resilient body portion of the grommet. This metallic insert includes a flared end which may form a tubular ferrule positioned about the end of the heating rod. This proivdes an annular trough about the heating rod to receive a quantity of epoxy which will both secure the mounting grommet to the heating rod and provide a fluid-tight seal therebetween.

Many objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
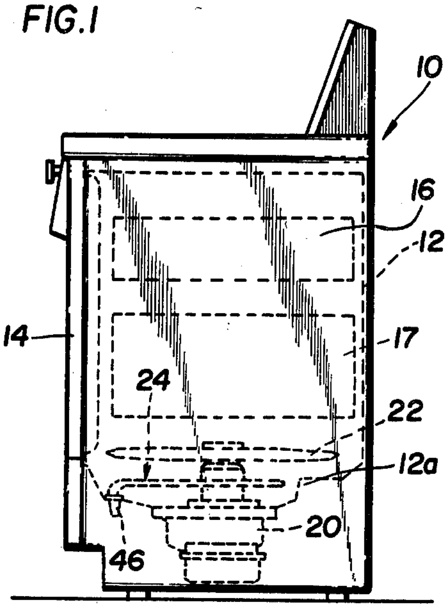
FIG. 1 is a side elevational view of a domestic type dishwashing machine wherein the novel mounting grommet and heating element of this invention can be utilized.

Referring now to FIG. 1 of the drawings, a dishwasher is designated generally by reference numeral 10 and is shown for the purpose of illustrating an environment for the novel heating element and mounting grommet arrangement of this invention. The dishwasher 10 includes a tub 12 provided with a downwardly-opening front door 14 through which dishes to be washed may be inserted into the tub 12. The dishes to be washed, rinsed and dried within the tub are supported within the tub by a pair of racks 16 and 17 which are readily accessible upon opening of the door 14. While a front-loading type dishwasher is shown for purposes of illustration, it will be understood that a top-loading type of dishwasher may incorporate the invention as well.

During the main washing and rinsing portion of the operating cycle of the dishwasher 10 as well as during the pre-rinsing operation which may be carried out prior to the main washing operation, water is drawn from the bottom of the tub 12 by a motor-pump assembly 20. This water is delivered to a water distributing impeller unit 22 which sprays the water over the dishes in the racks 16 and 17.

In accordance with this invention, a heating unit 24 is mounted at the bottom of the tub 12 immediately adjacent the bottom wall 12*a* and motor-pump unit 20. The heating unit 24 will be energized at a relatively high temperature when water is in the tub to raise the temperature of the water for washing purposes. When a drying cycle occurs at the end of the wash, rinse cycle, the heating unit is energized at a lower temperature to heat the interior of the tub.

The structure of the dishwasher 10 has been illustrated merely to outline one particular environmental setting for the invention disclosed herein. It will be understood, however, that the dishwasher 10 includes numerous additional components, preferably electrically operated, for performing such functions as introducing water into the tub 12 prior to the main washing and rinsing operation, and prior to the prerinsing operation preceding the main washing operation if such prerinsing operation is utilized, and thereafter, draining the water from the tub 12 after the washing and rinsing operations are completed. The dishwasher herein illustrated may also include means for circulating heated air over the dishes in the racks 16 and 17 during the drying operation. These various operations are carried out under the control of a timer and timer means which are associated with dishwashers, and are well known in the art and need not be described in detail.

Figure 2:
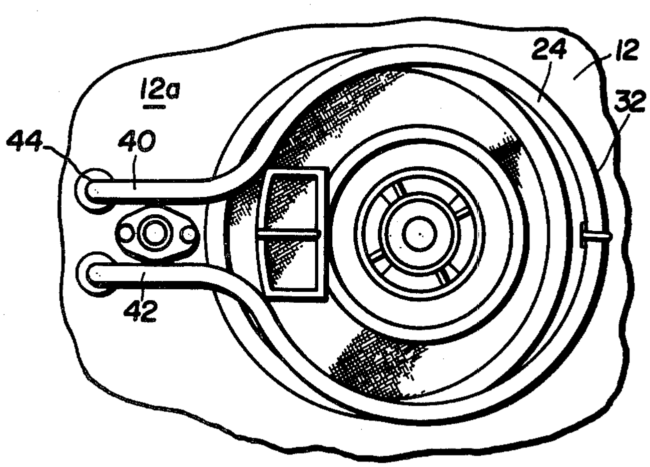
FIG. 2 is an enlarged fragmentary view taken along line 2—2 of FIG. 1 illustrating the mounting of the heating element through the lower bulkhead of the dishwasher of FIG. 1.
Figure 3:
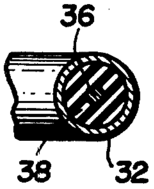
FIG. 3 is a sectional view taken along line 3—3 of FIG. 2 and shows the internal configuration of the electric heating element used with this invention.

Referring now to FIG. 2 of the drawings, the heating element 24 is shown in more detail as well as the manner in which it is mounted to the bottom wall portion 12*a* of the tub 12. As best seen in the FIGS. 2 and 3, the heating element 24 includes an outer sheet or tubular rod element 32 through which a resistance heating wire passes and is connected to a cold pin 36. The heating wire is maintained insulated from the tubular rod 32 by insulation material 38 such as magnesium oxide which is of a high heat resistance type of material. This structural portion of the invention is well known in the art and forms no part of this invention.

In accordance with the novel concepts of this invention, a pair of terminating ends 40 and 42 of the heating unit 24 are provided with improved mounting grommets 44 and 46, respectively. The mounting grommets 44 and 46 pass through apertures formed in the bottom wall 12*a* and are firmly held in place as a result of their general configuration. Therefore, threaded lock nuts and the like are no longer necessary when utilizing the structure of this invention.

Figure 4:
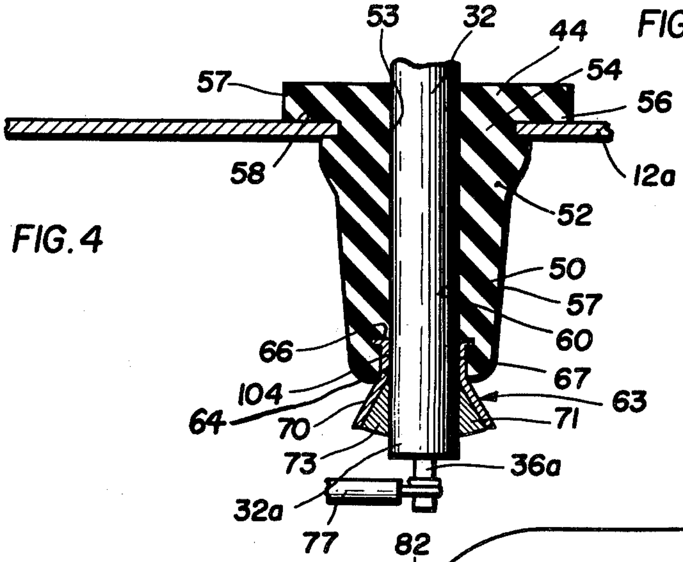
FIG. 4 is a detailed showing of one end portion of a portion of the resistance heating element with the novel mounting grommet of this invention secured thereto.

Referring now to FIG. 4, one configuration of the novel mounting grommet of this invention is illustrated and is designated generally by reference numberal 44. It will be understood that the mounting grommet 46 is substantially the same as the mounting grommet 44 and, therefore, need not be described herein. The mounting grommet 44 is constructed of resilient material which may be molded by, for example, an injection-molding process, or the like. The grommet 44 has a resilient body portion 50 of generally conical configuration with an outside sloping wall 51. The body portion 50, along the length of the sloping wall 51, leads into a shoulder portion 52 of larger diameter. The diameter of the shoulder portion 52 is greater than the inside diameter of an aperture 53, in the bulkhead 12*a*, through which the grommet is forcibly urged. While the aperture 53 is shown formed in the bottom wall portion 12*a*, of FIGS. 1 and 2, it will be understood that the aperture may be formed in the rear or side walls as well. Immediately adjacent the enlarged diameter shoulder portion 52 is a neck portion 54 which is substantially of the same diameter, or slightly larger, than the inside diameter of the aperature 53. This provides a tight fit between the grommet 54 and the wall 12*a* so that a fluid-tight seal is formed therebetween.

A head portion 56 is formed integral with the neck portion 54 and this radially outwardly directed annular flange portions 57 overlying the peripheral margin 58 immediately adjacent the apperture 53. This further insures a fluid-tight seal will be formed when the mounting grommet is urged through the aperture 53.

In accordance with another aspect of this invention, the body portion 50, shoulder portion 52, neck portion 54 and head portion 56 are provided with a coaxial passage 60 to receive the heating rod element 32. Preferably, the inside diameter of the passage 60 is slightly less than that of the outside diameter of the rod element 32 so that a tight leak-proof fit is obtained.

Most advantageously, fluid-tight seal means as well as securing means are provided at the end portion 50*a* of the body 50. The seal means includes a rigid annular member 63 which has a first cylindrical portion 64 inserted into the resilient body portion of the grommet 44. The cylindrical portion 64 includes a radially outwardly directed annular flange 66 which fits into a correspondingly shaped annular recess 67 formed in the body portion 50. Preferably, the inside diameter of the cylindrical portion 64 is substantially the same as that of the outside diameter of the rod 32 and is coaxial with the passage 60. The rigid annular member 63 includes a second, substantially conical portion 70 which forms an annular trough 71 about the end portion 32*a* of the rod 32. This annular trough provides a receptacle for receiving a quantity of adhesive sealant, designated generally by reference numeral 73.

In operation, the electric heating unit 24 with the grommets 44 and 46 attached thereto is positioned within the tub 12 so that the terminating ends 40 and 42 are near corresponding apertures formed in the bottom wall 12*a*. The mounting grommets 44 and 46 are placed in registry with the apertures and then forcibly urged therethrough so that the shoulder portion 52 of the grommets snaps through the aperture. The mounting grommet therefore provides a tight mechanical connection as well as a fluid-tight seal with the bulkhead 12*a*. After the grommets 44 and 64 are inserted, electrical power leads are fastened to the cold pin end 36*a* of the electric resistance heating wire 36. In FIG. 4 the electrical connection is illustrated by the wire 77.

Figure 5:
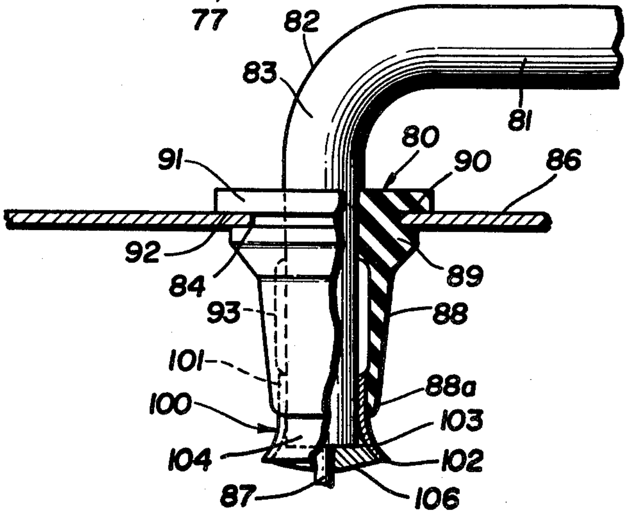
FIG. 5 illustrates an alternate configuration of a novel mounting grommet constructed in accordance with the principles of this invention.

Referring now to FIG. 5 there is seen an alternate embodiment of a mounting grommet constructed in accordance with the principles of this invention and designated generally by reference numeral 80. Also in this embodiment, an alternate configuration of the end portion of the electric heating rod is shown. Here an electric heating rod 81 is provided with a relatively sharp bent portion 82 leading into a straight portion 83 which is substantially 90° from the portion 81. The straight portion 83 is of a length to pass through an aperture 84 in a bulkhead 86. A cold pin or lead terminal 87 is provided for connection to a source of energizing power substantially in the same manner as set forth in regard to the structure of FIG. 4. Also, it will be understood that the electric resistance heating element passing through the hollow rod 81 is insulated therefrom by insulating means similar to that shown in FIG. 3.

The mounting grommet 80 has a resilient body portion 88 leading into a shoulder portion 89 formed integral therewith. A neck portion 90 is sized to be inserted into the aperture 84 and to form a fluid-tight seal therewith. Immediately adjacent and integral with the neck portion 90 is a head portion 91 which overlies a peripheral margin 92 of the aperture 84.

In the embodiment of FIG. 5, the mounting grommet 80 is provided with an enlarged diameter portion 93 substantially centrally of the resilient body portion 88 to be free from contact with the tubular rod 81. This provides a contact seal at the head portion and at the end portion 88*a* of the body 88. The enlarged diameter portion 93 may be filled with an adhesive sealant if desired.

Most advantageously, a flared tubular ferrule or insert 100 has a substantially cylindrical first portion 101 inserted into the enlarged diameter portion 93. The inside diameter of the cylindrical portion 101 is substantially the same as that of the outside diameter of the hollow rod element 81 and forms a snug fit therewith. The tubular ferrule 100 further includes a second outwardly diverging portion 102 which forms an annular trough 103 extending beyond an end portion 104 of the hollow tubular rod 81. A quantity of adhesive sealant 106 is provided in the trough 103 to form both a sound mechanical connection and a fluid-tight seal between the end portion 88*a* of the body 88 and the end portion 104 of the hollow tubular member 81.

In operation, the mounting grommet 80 of FIG. 5 is used substantially in the same manner as that of the mounting grommets 44 and 46 of FIGS. 2 and 4. In both cases the sheath 32 or 82 would be electrically connected (grounded) to the housing of the appliance 10. This may conveniently be done by providing a connection terminal on one of elements 63 or 100 and connecting a grounding wire from there to a convenient portion of the housing such as the bulkhead wall 12*a* or 86.

While only two specific embodiments of the present invention have been illustrated herein in great detail, it will be understood that variations and modifications may be effected without departing from the spirit and scope of the novel concepts disclosed and claimed herein.

The invention is claimed as follows:

1. A mounting grommet for mounting a rod element through an aperture in a bulkhead of predetermined thickness, comprising:

a resilient body portion of a size to be forcibly urged through the aperture;

a neck portion formed integral with said resilient body portion and having an axial extent greater than the predetermined thickness of the bulkhead to receive the bulkhead, said neck portion being of a width to substantially fill the aperture formed in the bulkhead;

a head portion formed integral with said neck portion to overlie the periphery of the aperture within the bulkhead of the side opposite said resilient body portion, a passage being formed axially through said resilient body portion, said neck portion and said head portion to receive the rod element therethrough; and seal means including a rigid annular member having a first portion inserted into said passage in said resilient body portion and a second portion generally conical in configuration extending axially of said body portion and divergent outwardly therefrom to form an annular trough about the rod element for receiving sealing adhesive therein.

2. A mounting grommet for mounting a rod element to a bulkhead as set forth in claim 1 wherein said first portion of said rigid annular member includes a radially outwardly directed annular flange, and said resilient body portion has a mating annular recess formed therein to receive said flange.

3. A mounting element for mounting a rod element to a bulkhead as set forth in claim 1 wherein said first portion of said rigid annular member is cylindrical in configuration and has an inside diameter substantially equal to the inside diameter of said passage through said resilient body member.

* * * * *